US010821942B2

(12) United States Patent
Green et al.

(10) Patent No.: US 10,821,942 B2
(45) Date of Patent: Nov. 3, 2020

(54) LIDAR WINDSCREEN VIBRATION CONTROL

(71) Applicant: Ford Global Technologies, LLC, Dearborn, MI (US)

(72) Inventors: Alfred Green, Belleville, MI (US); David Karl Bidner, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 298 days.

(21) Appl. No.: 15/986,147

(22) Filed: May 22, 2018

(65) Prior Publication Data

US 2019/0359179 A1 Nov. 28, 2019

(51) Int. Cl.
| | | |
|---|---|---|
| *B60S 1/56* | (2006.01) | |
| *B08B 7/02* | (2006.01) | |
| *B60S 1/48* | (2006.01) | |
| *B60S 1/02* | (2006.01) | |
| *G02B 27/00* | (2006.01) | |
| *G05D 1/02* | (2020.01) | |

(52) U.S. Cl.
CPC ................. *B60S 1/56* (2013.01); *B08B 7/02* (2013.01); *B60S 1/02* (2013.01); *B60S 1/486* (2013.01); *G02B 27/0006* (2013.01); *G05D 1/021* (2013.01)

(58) Field of Classification Search
CPC .... B60S 1/56; B60S 1/02; B60S 1/486; B08B 7/02; G05D 1/021; G02B 27/0006
See application file for complete search history.

(56) References Cited

U.S. PATENT DOCUMENTS

| | | | | |
|---|---|---|---|---|
| 5,012,593 A | * | 5/1991 | Okada | B60R 1/0602 |
| | | | | 15/250.003 |
| 9,278,670 B2 | | 3/2016 | Hattori et al. | |
| 9,505,382 B2 | * | 11/2016 | Gokan | B60S 1/0848 |
| 10,144,394 B1 | * | 12/2018 | Rice | B60S 1/56 |
| 10,173,646 B1 | * | 1/2019 | Rice | B60S 1/56 |
| 10,432,827 B2 | * | 10/2019 | Hartranft | B60S 1/522 |
| 2011/0073142 A1 | * | 3/2011 | Hattori | B60S 1/56 |
| | | | | 134/56 R |
| 2012/0243093 A1 | * | 9/2012 | Tonar | G03B 17/08 |
| | | | | 359/507 |
| 2016/0170203 A1 | | 6/2016 | Weigert et al. | |
| 2017/0036647 A1 | * | 2/2017 | Zhao | B60S 1/52 |
| 2017/0036650 A1 | * | 2/2017 | Hester | B60S 1/56 |
| 2017/0349147 A1 | * | 12/2017 | Blank | B60S 1/56 |
| 2017/0361360 A1 | * | 12/2017 | Li | B08B 7/028 |

(Continued)

FOREIGN PATENT DOCUMENTS

| | | |
|---|---|---|
| CN | 102143308 A | 8/2011 |
| DE | 102015118670 A1 | 5/2017 |

(Continued)

*Primary Examiner* — Sze-Hon Kong
(74) *Attorney, Agent, or Firm* — Frank A. MacKenzie; Bejin Bieneman PLC

(57) ABSTRACT

A vehicle computer includes a memory and a processor. The processor is programmed to execute instructions stored in the memory. The instructions include determining a vehicle speed, selecting at least one actuator to vibrate a sensor housing based on the vehicle speed, and commanding the at least one actuator to vibrate the sensor housing in accordance with the vehicle speed to remove debris from the sensor housing.

20 Claims, 5 Drawing Sheets

(56) References Cited

U.S. PATENT DOCUMENTS

| | | | |
|---|---|---|---|
| 2018/0031826 A1 | 2/2018 | Fedigan et al. | |
| 2018/0081055 A1* | 3/2018 | Guenzel | B60Q 9/008 |
| 2018/0154406 A1* | 6/2018 | Magee | G02B 27/0006 |
| 2019/0124292 A1* | 4/2019 | Yumoto | G06T 1/00 |
| 2019/0129129 A1* | 5/2019 | Chen | H04N 5/2171 |
| 2019/0135239 A1* | 5/2019 | Rice | B60S 1/54 |
| 2019/0162953 A1* | 5/2019 | Bretagnol | B08B 17/06 |
| 2019/0270433 A1* | 9/2019 | Hester | B08B 3/024 |
| 2019/0277787 A1* | 9/2019 | Chung | B60J 1/00 |
| 2019/0283729 A1* | 9/2019 | Ikebata | B60S 1/56 |
| 2019/0315353 A1* | 10/2019 | Dakemoto | B60S 1/56 |
| 2019/0322245 A1* | 10/2019 | Kline | B60S 1/56 |
| 2019/0329737 A1* | 10/2019 | Bretagnol | B60S 1/56 |
| 2020/0061677 A1* | 2/2020 | Nakano | H01L 41/09 |
| 2020/0110407 A1* | 4/2020 | Miura | B60W 50/14 |
| 2020/0139939 A1* | 5/2020 | Kubota | G01S 7/497 |
| 2020/0180567 A1* | 6/2020 | Sakai | B60S 1/60 |

FOREIGN PATENT DOCUMENTS

| | | |
|---|---|---|
| FR | 2841488 A1 | 1/2004 |
| GB | 2501500 A | 10/2013 |
| JP | 5948781 B2 | 7/2016 |

* cited by examiner

LIDAR WINDSCREEN VIBRATION CONTROL

BACKGROUND

Autonomous vehicles rely on data from sensors to navigate the environment around the autonomous vehicle. Examples of sensors that can provide data used in the operation of an autonomous vehicle include lidar sensors, radar sensors, ultrasonic sensors, and cameras. The autonomous vehicle can control steering, braking, and acceleration based on the sensor data.

DETAILED DESCRIPTION

Figure 1:
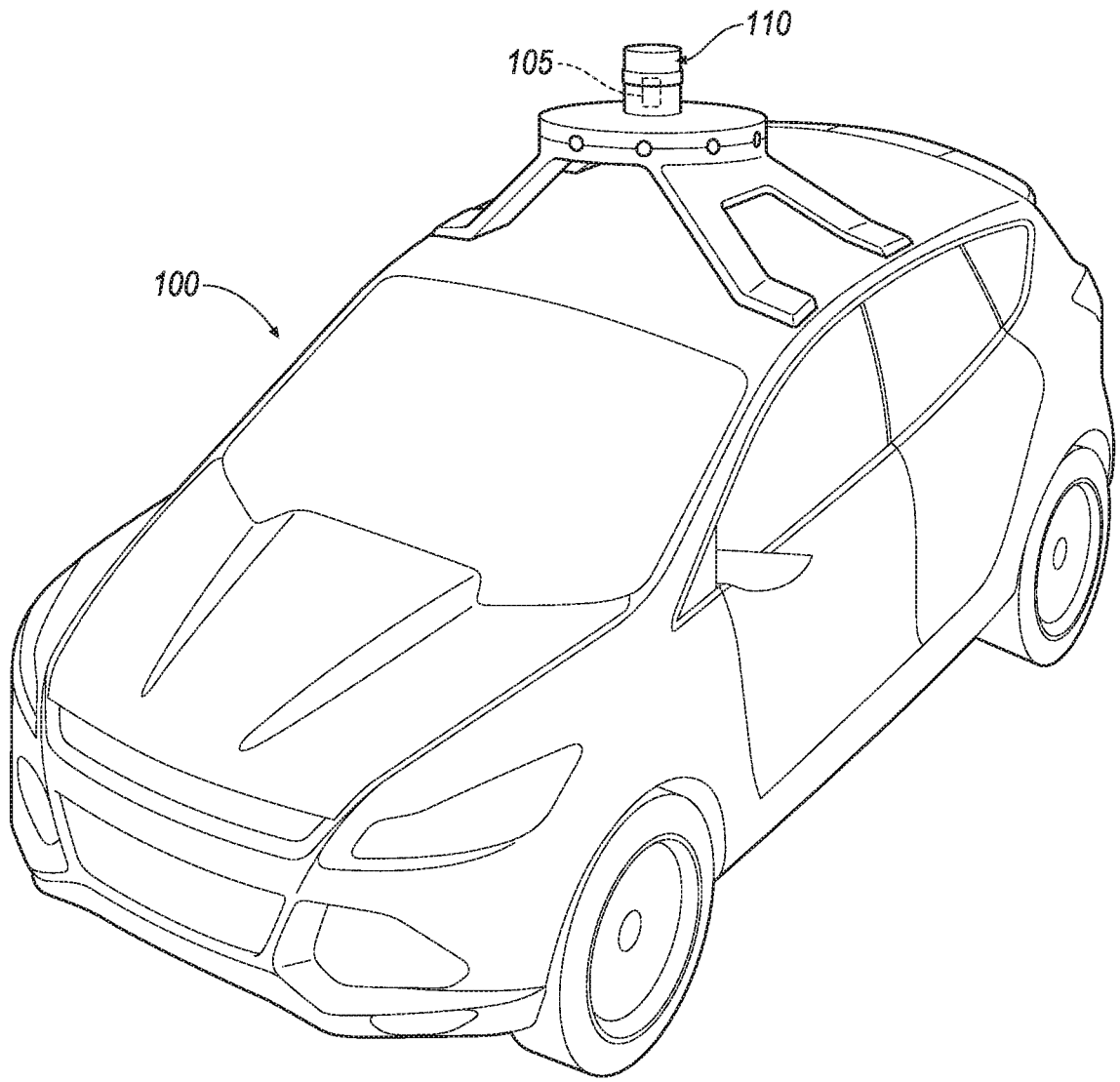
FIG. 1 illustrates an example host vehicle with a sensor cleaning system.

Exposure to the elements can affect the outputs of sensors on autonomous vehicles. For example, rain, snow, ice, dirt, salt, and other debris collecting on a sensor lens (or protective windscreen) can affect how the sensor perceives the environment around the autonomous vehicle similar to the way debris on the windshield can affect a human driver's view of the road. A human driver can remove debris from the windshield by activating the windshield wipers, with or without washer fluid that can rinse debris from the windshield. One challenge with autonomous vehicles, however, is that a human passenger may not be available to remove the debris from the sensor lens or windscreen. Also, the human passenger may not be able to see debris on the sensor lens or windscreen, even if the human passenger were available to clear the debris.

A sensor cleaning system that can remove debris from the sensor housing is implemented via a vehicle computer having a memory and a processor programmed to execute instructions stored in the memory. The instructions include determining a vehicle speed, selecting at least one actuator to vibrate a sensor housing based on the vehicle speed, and commanding the at least one actuator to vibrate the sensor housing in accordance with the vehicle speed to remove debris from the sensor housing.

Selecting the at least one actuator may include selecting from among a first actuator and a second actuator, where the first actuator is disposed on the sensor housing and configured to vibrate the sensor housing in an axial direction. The second actuator may be disposed on the sensor housing and configured to vibrate the sensor housing in a radial direction. Alternatively or in addition, selecting the at least one actuator to vibrate the sensor housing based on the vehicle speed may include selecting the first actuator to vibrate the sensor housing as a result of determining that the vehicle speed is below a predetermined threshold. Alternatively or in addition, selecting the at least one actuator to vibrate the sensor housing based on the vehicle speed may include selecting the second actuator to vibrate the sensor housing as a result of determining that the vehicle speed is above a predetermined threshold.

Selecting the at least one actuator may include selecting a first actuator and a second actuator to vibrate the sensor housing where the first actuator is configured to vibrate the sensor housing in an axial direction and the second actuator is configured to vibrate the sensor housing in a radial direction. In that implementation, commanding the at least one actuator includes sending a first signal to the first actuator, the first signal commanding the first actuator to vibrate in accordance with a first magnitude, and sending a second signal to the second actuator, the second signal commanding the second actuator to vibrate in accordance with a second magnitude. In that implementation, the first magnitude may be different from the second magnitude. Alternatively or in addition, the processor may be programmed to select the first magnitude and the second magnitude based on the vehicle speed. Alternatively or in addition, selecting the first magnitude and the second magnitude based on the vehicle speed may include selecting the first magnitude to be greater than the second magnitude as a result of determining that the vehicle speed is below a predetermined threshold. In some instances, selecting the first magnitude and the second magnitude based on the vehicle speed may include selecting the second magnitude to be greater than the first magnitude as a result of determining that the vehicle speed is above a predetermined threshold.

In some possible implementations, the first signal commands the first actuator to vibrate at a first plurality of different frequencies over time and the second signal commands the second actuator to vibrate at a second plurality of different frequencies over time. The first plurality of different frequencies may include a first minimum frequency and a first maximum frequency. The second plurality of different frequencies may include a second minimum frequency and a second maximum frequency. The first minimum frequency may be different from the second minimum frequency. The first maximum frequency may be different from the second maximum frequency.

In some possible approaches, the processor may be programmed to clip at least one of the first plurality of different frequencies and second plurality of different frequencies.

An example method includes determining a vehicle speed, selecting at least one actuator to vibrate a sensor housing based on the vehicle speed, and commanding the at least one actuator to vibrate the sensor housing in accordance with the vehicle speed to remove debris from the sensor housing.

In the method, selecting the at least one actuator may include selecting a first actuator and a second actuator to vibrate the sensor housing, where the first actuator is configured to vibrate the sensor housing in an axial direction and the second actuator is configured to vibrate the sensor housing in a radial direction. Commanding the at least one actuator may include sending a first signal to the first actuator, the first signal commanding the first actuator to vibrate in accordance with a first magnitude, and sending a second signal to the second actuator, the second signal commanding the second actuator to vibrate in accordance with a second magnitude. The first magnitude and the second magnitude may be selected based on the vehicle speed.

The method may further include comparing the vehicle speed to a predetermined threshold. In that implementation, selecting the first magnitude and the second magnitude based on the vehicle speed may include selecting the first magnitude to be greater than the second magnitude as a result of determining that the vehicle speed is below the predetermined threshold and selecting the second magnitude to be greater than the first magnitude as a result of determining that the vehicle speed is above the predetermined threshold.

In the method, the first signal may command the first actuator to vibrate at a first plurality of different frequencies over time and the second signal may command the second actuator to vibrate at a second plurality of different frequencies over time. The first plurality of different frequencies may include a first minimum frequency and a first maximum frequency. The second plurality of different frequencies may include a second minimum frequency and a second maximum frequency.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

As illustrated in FIG. 1, a host vehicle 100 includes a sensor cleaning system 105. Although illustrated as a sedan, the host vehicle 100 may include any passenger or commercial automobile such as a car, a truck, a sport utility vehicle, a crossover vehicle, a van, a minivan, a taxi, a bus, etc. The host vehicle 100 may operate in an autonomous (e.g., driverless) mode, a partially autonomous mode, and/or a non-autonomous mode. The partially autonomous mode may refer to the SAE Level 2 mode of operation where the host vehicle 100 can control steering, acceleration, and braking under certain circumstances without human interaction. The partially autonomous mode may further refer to the SAE Level 3 mode of operation where the host vehicle 100 can handle steering, acceleration, and braking under certain circumstances, as well as monitoring of the driving environment, even though some human interaction is sometimes needed. To implement the autonomous and partially autonomous modes of operation, the host vehicle 100 may include a virtual driver system and an automated vehicle platform. The virtual driver system is a computing platform, implemented via sensors, controllers, circuits, chips, and other electronic components, that control various autonomous operations of the host vehicle 100. The virtual driver system includes an autonomous vehicle controller (i.e., a vehicle computer) programmed to process the data captured by on-board vehicle sensors 110, which may include a lidar sensor, a radar sensor, a camera, ultrasonic sensors, etc. The autonomous vehicle controller is programmed to output control signals to components of the automated vehicle platform to autonomously control the host vehicle 100 according to the data captured by the sensors. The automated vehicle platform refers to the components that carry out the autonomous vehicle operation upon instruction from the virtual driver system, and specifically, from the autonomous vehicle controller. As such, the automated vehicle platform includes various actuators incorporated into the host vehicle 100 that control the steering, propulsion, and braking of the host vehicle 100. The automated vehicle platform further includes various platform controllers (sometimes referred to in the art as "modules"), such as a chassis controller, a powertrain controller, a body controller, an electrical controller, etc.

Figure 2:
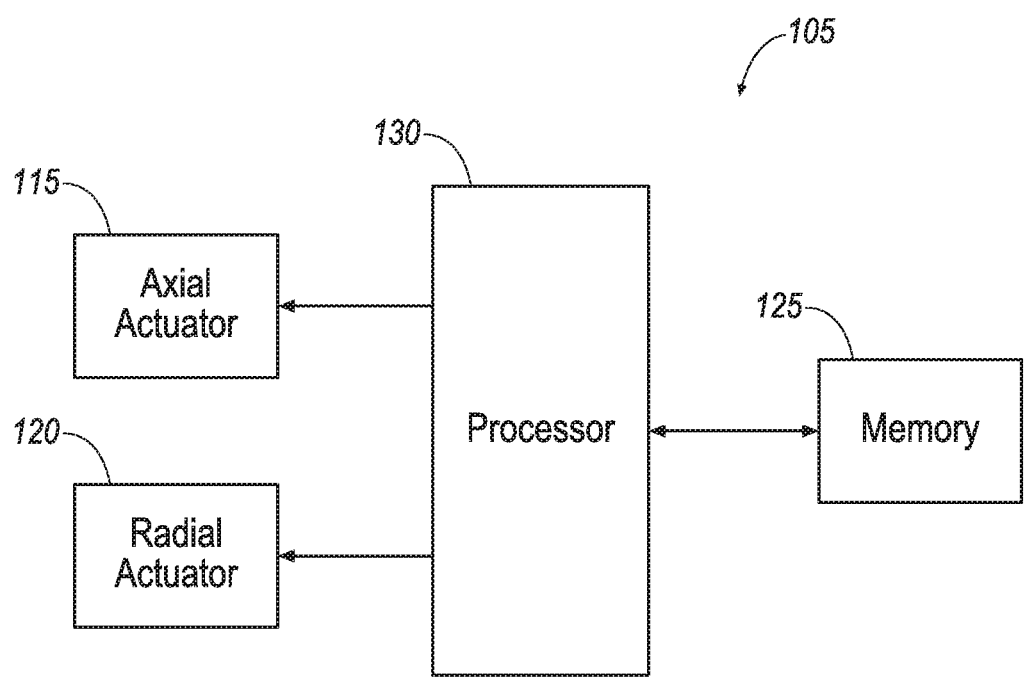
FIG. 2 is a block diagram showing example components of the sensor cleaning system.

The sensor cleaning system 105 is implemented via circuits, chips, actuators, or other electronic components that can clean debris from certain on-board vehicle sensors 110 based on the speed of the host vehicle 100. For example, with reference to FIG. 2, the sensor cleaning system 105 includes an axial actuator 115, a radial actuator 120, a memory 125, and a processor 130.

The axial actuator 115 and radial actuator 120 are electromechanical devices controlled by control signals output by the processor 130. Electrical control signals output by the processor 130 are converted, by the axial actuator 115 and radial actuator 120 into mechanical motion. The intensity of the mechanical motion (i.e., the magnitude of the vibration) may be based on a characteristic (e.g., frequency, amplitude, or duty cycle) of the control signal. Examples of actuators may include a linear actuator, a servo motor, or the like.

The axial actuator 115 and radial actuator 120 may each be attached to a windscreen 135, or other component of the sensor housing (see FIGS. 3A-3B), of the vehicle sensor 110. Moreover, the axial actuator 115 and the radial actuator 120 may cause the windscreen 135 of the vehicle sensor 110 to vibrate in different ways. For instance, the axial actuator 115 may cause the windscreen 135 to vibrate in an axial direction. For purposes of this disclosure, the axial direction may be perpendicular to a direction of vehicle movement and perpendicular to the surface upon which the vehicle sensor 110 is located. Put another way, the axial direction may be aligned with the direction of gravity (i.e., "up and down"). The radial actuator 120 may cause the windscreen 135 to vibrate in a radial direction. For purposes of this disclosure, the radial direction may be parallel to a direction of vehicle movement, parallel to the surface upon which the vehicle sensor 110 is located, or both. In other words, the radial direction may be perpendicular to the direction of the force of gravity (i.e., "side-to-side"). The axial actuator 115 and radial actuator 120 may be controlled by different control signals. Thus, the processor 130 may output control signals to separately activate the axial actuator 115 and the radial actuator 120 at different times, at different intensities, or both.

The memory 125 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory 125 may store instructions executable by the processor 130 and data such as the vehicle speed, wind speed, etc. The instructions and data stored in the memory 125 may be accessible to the processor 130 and possibly other components of the sensor cleaning system 105, the host vehicle 100, or both.

The processor 130 is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. The processor 130 is programmed to execute instructions stored in the memory 125. The instructions stored in the memory 125 and executable by the processor 130 include determining a vehicle speed, selecting the axial actuator 115, radial actuator 120, or both, based on the vehicle speed, and commanding the selected actuator to vibrate a sensor housing to remove debris from the sensor housing.

The processor 130 may be programmed to determine the vehicle speed based on the output of, e.g., a vehicle speed sensor (a speedometer), a navigation system, or the like. In some instances, the vehicle speed may be stored in the memory 125 and the processor 130 may be programmed to determine the vehicle speed by accessing the vehicle speed from the memory 125. The processor 130 may be programmed to compare the vehicle speed to a predetermined threshold. The predetermined threshold may be stored in the memory 125 and may indicate whether the host vehicle 100 is traveling at a low speed (e.g., a speed below the predetermined threshold) or a high speed (e.g., a speed above the predetermined threshold). Selecting the actuator based on the vehicle speed may include selecting the axial actuator 115 to vibrate the sensor housing as a result of determining that the vehicle speed is below the predetermined threshold and selecting the radial actuator 120 to vibrate the sensor housing as a result of determining that the vehicle speed is above the predetermined threshold. Thus, when the vehicle is stopped or traveling at low speeds, the axial vibration will help to remove debris from the windscreen 135 with the assistance of gravity. When the vehicle is traveling at higher speeds, however, the radial vibration will help the debris catch air flow around the windscreen 135.

In some instances, the processor 130 may be programmed to select both the axial actuator 115 and the radial actuator 120. The magnitude of the vibrations for each actuator, however, may be based on the vehicle speed. Further, in instances where both actuators are selected to vibrate the sensor housing, the magnitude of the vibrations of the actuators may be different from one another. By way of example, at low speeds or when the host vehicle 100 is stopped (i.e., when the vehicle speed is below the predetermined threshold), both the axial actuator 115 and radial actuator 120 may be activated via control signals, and the control signal powering the axial actuator 115 may command a greater magnitude of vibration than the control signal powering the radial actuator 120. The opposite may happen at higher speeds (i.e., when the vehicle speed is above the predetermined threshold). That is, when the vehicle speed is above the predetermined threshold, the control signal powering the radial actuator 120 may command a greater magnitude of vibration than the control signal powering the axial actuator 115. As previously discussed, the magnitude of the vibration of each actuator may controlled by a characteristic of the control signal controlling the actuator. The characteristic may refer to the frequency, amplitude, or duty cycle of the control signal. The processor 130 may be programmed to select the magnitude of the vibration for each of the actuators in accordance with the vehicle speed and output the appropriate control signal commanding the axial actuator 115 and radial actuator 120 to vibrate in accordance with their respective selected magnitudes of vibration.

Besides magnitude, the processor 130 may be programmed to output control signals to control the frequencies of the vibrations of the axial sensor and the radial sensor. For instance, at low speeds or when the host vehicle 100 is stopped (i.e., when the vehicle speed is below the predetermined threshold), both the axial actuator 115 and radial actuator 120 may be activated via control signals, and the axial actuator 115 may be commanded to vibrate at a greater frequency than the radial actuator 120. The opposite may happen at higher speeds (i.e., when the vehicle speed is above the predetermined threshold). That is, when the vehicle speed is above the predetermined threshold, the radial actuator 120 may be commanded to vibrate at a greater frequency than the axial actuator 115. The frequencies of the vibrations of each actuator may controlled by a characteristic of the control signal controlling the actuator. The characteristic may refer to the frequency, amplitude, or duty cycle of the control signal. The processor 130 may be programmed to select the frequencies of the vibration for each of the actuators in accordance with the vehicle speed and output the appropriate control signal commanding the axial actuator 115 and radial actuator 120 to vibrate in accordance with their respective selected frequencies of vibration.

In some instances, the processor 130 may be programmed to command the axial actuator 115, the radial actuator 120, or both, to vibrate within different ranges of frequencies. For instance, the processor 130 may output control signals commanding the axial actuator 115 to vibrate according to a first group of frequencies and the radial actuator 120 to vibrate according to a second group of frequencies. The frequencies of the first group and second group may be the same or different from one another, and the frequencies may change over time. That is, the frequency of the vibrations of the axial actuator 115 may change between a first minimum frequency and a first maximum frequency over a period of time while the sensor cleaning system 105 is operating. Likewise, the frequency of the vibrations of the radial actuator 120 may change between a second minimum frequency and a second maximum frequency over a period of time while the sensor cleaning system 105 is operating. Any one of the first and second minimum and maximum frequencies may be based on the vehicle speed. Alternatively, any one of the first and second minimum and maximum frequencies may be calibration settings. In some instances, the first and second minimum and maximum frequencies may be stored in the memory 125 and accessed by the processor 130 when needed to control the axial actuator 115, the radial actuator 120, or both.

In some possible implementations, the processor 130 may be programmed to clip the frequencies of vibration of the actuators. One reason the processor 130 may be programmed to do so is to keep the actuator from generating noise audible to a nearby person, including the driver or passenger of the host vehicle 100. That is, if the processor 130 calculates a frequency of vibration for the actuator that is within the audible range of frequencies for humans, the processor 130 may be programmed to clip the frequency by, e.g., commanding the actuator to vibrate at a higher or lower frequency to keep the actuator vibrations from becoming audible.

Figure 3A:
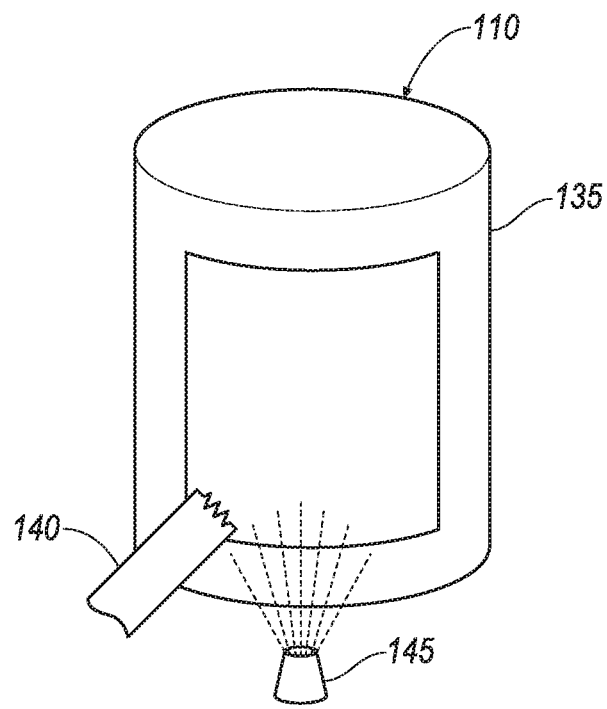
FIGS. 3A and 3B illustrate example components of the sensor cleaning system disposed on an on-board vehicle sensor.
Figure 3B:
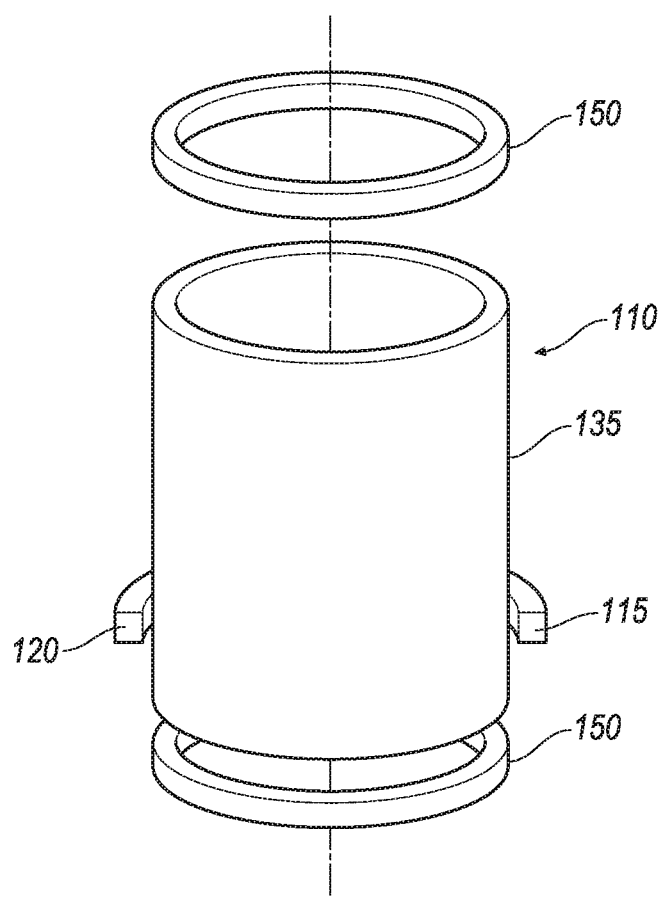

FIGS. 3A-3B illustrate example components of the vehicle sensor 110 having the sensor cleaning system 105. FIG. 3A shows the vehicle sensor 110 having a housing including a windscreen 135, heater 140, and a fluid nozzle 145.

The windscreen 135 is implemented via glass or plastic that is at least partially transparent. At the very least, the windscreen 135 is transparent to light in certain frequency ranges depending on the type of vehicle sensor 110. A lidar sensor, camera, IR sensor, etc., may be transparent to different frequency ranges with some or no overlap. Therefore, the windscreen 135 for each of those types of vehicle sensors 110 may be transparent to different frequency ranges of light.

The heater 140 is implemented via a resistive heating element attached to the windscreen 135. When provided with electrical energy, the temperature of the resistive heating element increases and radiates heat. The heat generated by the heater 140 is applied to the windscreen 135 to, e.g., remove snow, ice, and frost from the windscreen 135.

The fluid nozzle 145 is attached to a fluid reservoir and used to direct washer fluid onto the windscreen 135. Washer fluid from the fluid reservoir is sprayed onto the windscreen 135 to wash debris from the windscreen 135.

FIG. 3B shows that one or more elastomeric rings 150 may be placed on the windscreen 135 to allow the windscreen 135 to vibrate without creating too much noise (e.g., rattling). FIG. 3B further shows the axial actuator 115 and radial actuator 120 located on the windscreen 135. The axial actuator 115 and radial actuator 120 are shown near the bottom of the windscreen 135 although they may be placed at other locations. In some possible approaches, the axial actuator 115 and radial actuator 120 are placed at locations of the windscreen 135 where they can vibrate the windscreen 135 while staying out of the field of view of the vehicle sensor 110.

Figure 4A:
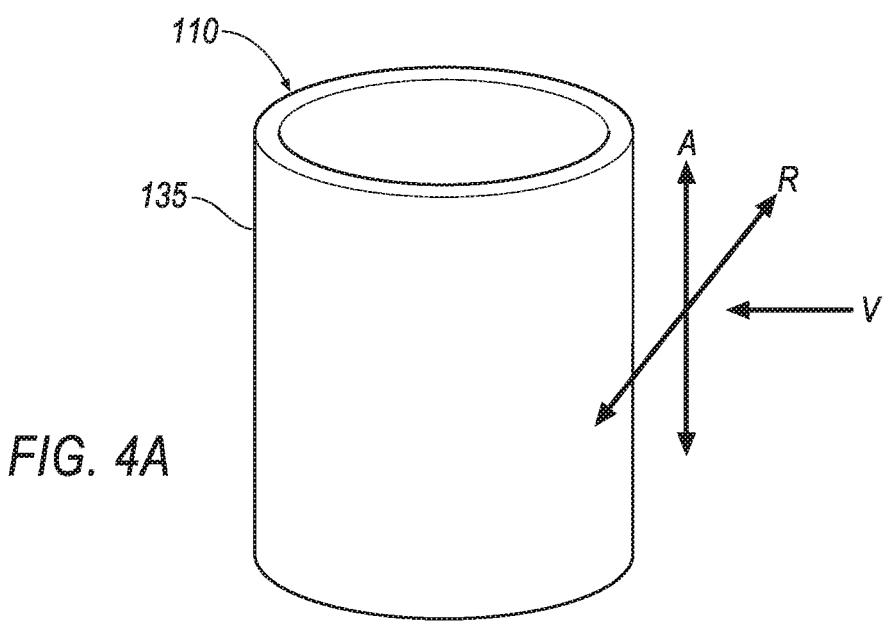
FIGS. 4A-4C collectively illustrate an example control scheme for components of the sensor cleaning system.
Figure 4B:
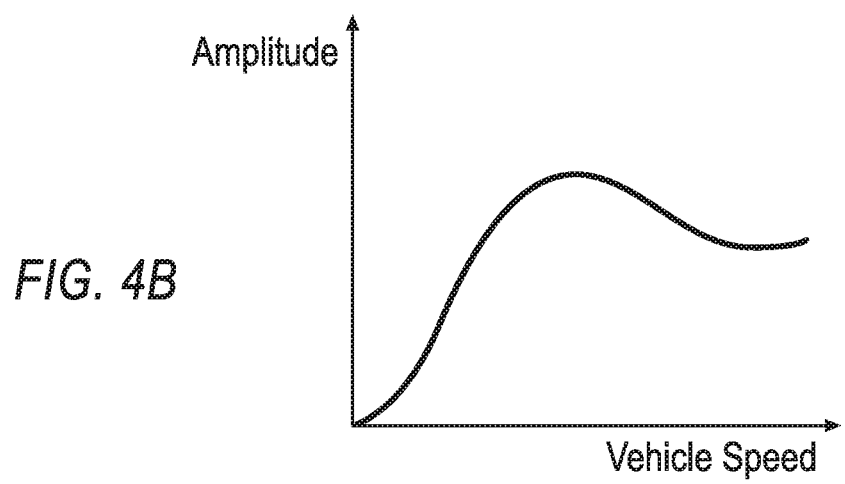
Figure 4C:
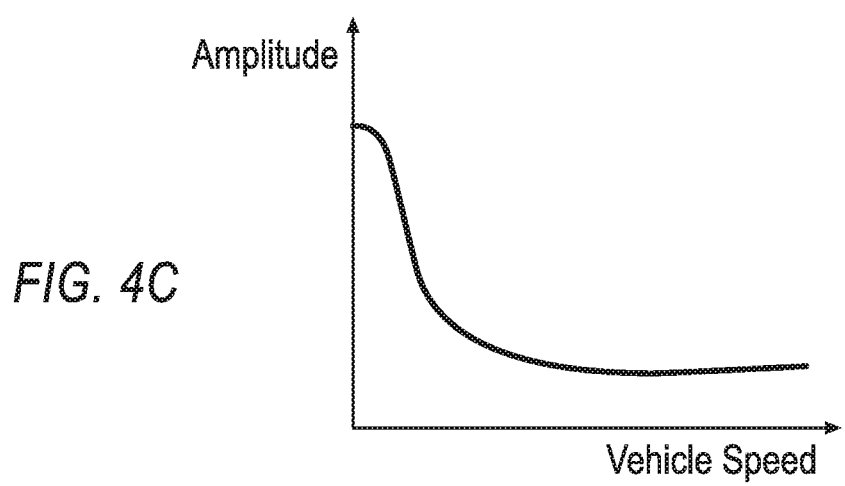

FIGS. 4A-4C collectively illustrate an example control scheme that may be implemented by the sensor cleaning system 105. The processor 130 discussed above may execute this control scheme to control the vibration of the windscreen 135 in the axial and radial directions in accordance with the vehicle speed. As previously explained, the processor 130 may control the vibration of the axial actuator 115 and the radial actuator 120. The axial direction A, the radial direction R, and the air velocity direction V are shown in FIG. 4A. The axial direction A and radial direction R are discussed above. The air velocity direction V refers to the direction of air relative to the host vehicle 100. Most of the time (e.g., absent extremely windy conditions), if the vehicle is moving, the air velocity direction V will be in the opposite direction of movement of the host vehicle 100. If the host vehicle 100 is moving slowly or is stopped, the air velocity direction V is generally the direction the wind is blowing although it could be opposite the direction the host vehicle 100 is moving if the host vehicle 100 is traveling faster than the wind speed.

FIGS. 4B and 4C illustrate example graphs showing the relationship between the amplitude of the vibrations on the Y-axis and the vehicle speed on the X-axis. Referring to the graph of FIG. 4B, which shows the amplitude of the vibrations of the radial actuator 120, the amplitude remains relatively low until the speed of the host vehicle 100 exceeds a predetermined threshold. At a certain point, however, the radial actuator 120 is assisted by the air velocity so the amplitude of the vibrations may drop slightly. Referring now to FIG. 4C, which shows the amplitude of the vibrations of the axial actuator 115, the amplitude of the vibrations is relatively high when the host vehicle 100 is stopped or moving slowly but drops as the host vehicle 100 begins to pick up speed.

Figure 5:
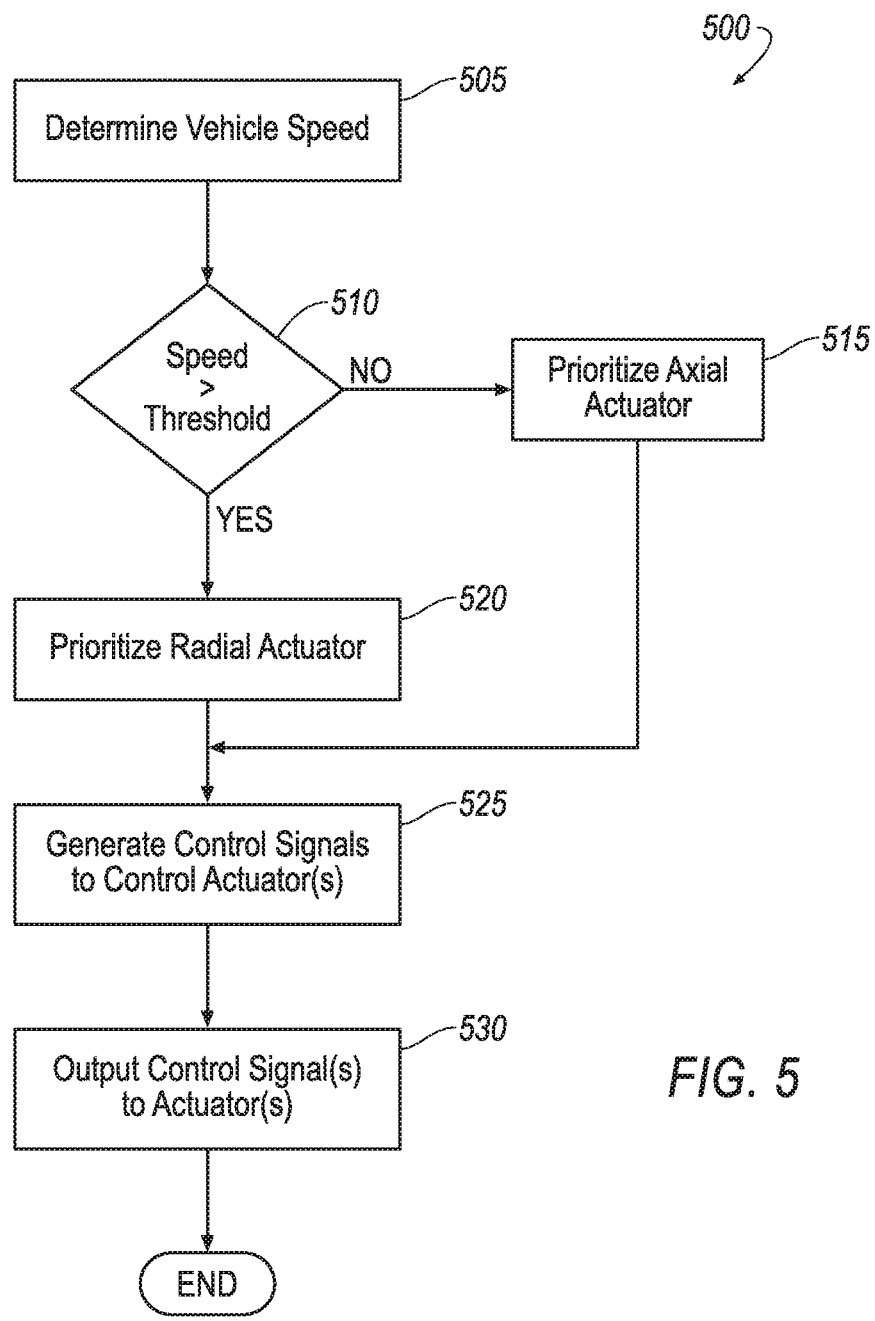
FIG. 5 is a flowchart of an example process that may be executed by a processor of the sensor cleaning system.

FIG. 5 is a flowchart of an example process 500 that may be executed by the sensor cleaning system 105. The process may be executed periodically during operation of the host vehicle 100, when debris is detected on the vehicle sensor 110, or in response to a user input requesting that the vehicle sensor 110 be cleaned.

At block 505, the sensor cleaning system 105 determines the vehicle speed. For example, the processor 130 may determine the vehicle speed based on the output of, e.g., a vehicle speed sensor (a speedometer), a navigation system, by accessing the vehicle speed from the memory 125, or the like.

At decision block 510, to select at least one actuator to vibrate the sensor housing (e.g., the windscreen 135 of the sensor housing) based on the vehicle speed, the sensor cleaning system 105 compares the vehicle speed to a predetermined threshold. The processor 130, for instance, may determine whether the vehicle speed is above the predetermined threshold or below the predetermined threshold and select whether to activate the axial actuator 115, the radial actuator 120, or both based on the result of comparing the vehicle speed to the predetermined threshold. If the processor 130 determines that the vehicle speed is below the predetermined threshold, the process 500 may proceed to block 515. Otherwise, the process 500 may proceed to block 520.

At block 515, the sensor cleaning system 105 prioritizes the axial actuator 115 as a result of determining that the vehicle speed is below the predetermined threshold. For example, the processor 130 may give priority to the axial actuator 115 as a result of determining that the vehicle speed is below the predetermined threshold. In this context, giving "priority" to the axial actuator 115 means that the vibrations of the axial actuator 115 will be of a greater magnitude (which could refer to the amplitude of the vibrations, the frequency of the vibrations, or both) than those of the radial actuator 120. Thus, the processor 130 may select the axial actuator 115 to vibrate the sensor housing at a greater magnitude than the radial actuator 120 when the axial actuator 115 is given priority.

At block 520, the sensor cleaning system 105 prioritizes the radial actuator 120 as a result of determining that the vehicle speed is above the predetermined threshold. That is, the processor 130 may give priority to the radial actuator 120 as a result of determining that the vehicle speed is above the predetermined threshold. In this context, giving "priority" to the radial actuator 120 means that the vibrations of the radial actuator 120 will be of a greater magnitude (which could refer to the amplitude of the vibrations, the frequency of the vibrations, or both) than those of the axial actuator 115. Thus, the processor 130 may select the radial actuator 120 to vibrate the sensor housing at a greater magnitude than the axial actuator 115 when the radial actuator 120 is given priority.

At block 525, the sensor cleaning system 105 generates control signals to control the axial actuator 115, the radial actuator 120, or both according to the prioritization assigned at blocks 515 or 520. That is, the processor 130 may generate control signals that cause the axial actuator 115, radial actuator 120, or both, to vibrate at particular magnitudes, frequencies, or both, given the vehicle speed. For instance, the processor 130 may generate a first control signal that, when output to the axial actuator 115, will cause the axial actuator 115 to vibrate in accordance with a first magnitude. The processor 130 may generate a second control signal that, when output to the radial actuator 120, will cause the radial actuator 120 to vibrate in accordance with a second magnitude. The processor 130 selects the first magnitude and second magnitude based on which actuator is given priority. And because priority is based on the vehicle speed, both the first magnitude and second magnitude are selected, by the processor 130, according to the vehicle speed. Further, as discussed above, the magnitudes of vibration may change over time. In other words, rather than selecting a particular magnitude, the processor 130 may generate control signals for the axial actuator 115 to vibrate at a first plurality of different frequencies over time and generate control signals for the radial actuator 120 to vibrate at a second plurality of different frequencies over time. In each instance, the processor 130 may generate control signals for the axial actuator 115 and radial actuator 120 to vibrate between the first and second minimum frequencies and the first and second maximum frequencies, discussed above, and any one of which may be selected according to the vehicle speed.

At block 530, the sensor cleaning system 105 outputs the control signals to the axial actuator 115, the radial actuator 120, or both. For instance, the processor 130 may output the control signals generated at block 525. Upon receipt of the control signals, one or both of the axial actuator 115 and the radial actuator 120 will vibrate the sensor housing based on the vehicle speed to, e.g., remove debris from the sensor housing.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle computer comprising:
a memory; and
a processor programmed to execute instructions stored in the memory, the instructions including:
determining a vehicle speed,
selecting at least one actuator to vibrate a sensor housing based on the vehicle speed, and commanding the at least one actuator to vibrate the sensor housing based on the vehicle speed to remove debris from the sensor housing;
wherein selecting the at least one actuator includes selecting from among a first actuator and a second actuator, wherein the first actuator is disposed on the sensor housing and configured to vibrate the sensor housing in an axial direction and the second actuator is disposed on the sensor housing and configured to vibrate the sensor housing in a radial direction;
wherein commanding the least one actuator to vibrate the sensor housing includes actuating the first actuator based on the vehicle speed relative to a predetermined threshold and actuating the second actuator based on the vehicle speed.

2. The vehicle computer of claim 1, wherein selecting the at least one actuator to vibrate the sensor housing based on the vehicle speed includes selecting the first actuator to vibrate the sensor housing as a result of determining that the vehicle speed is below the predetermined threshold.

3. The vehicle computer of claim 1, wherein selecting the at least one actuator to vibrate the sensor housing based on the vehicle speed includes selecting the second actuator to vibrate the sensor housing as a result of determining that the vehicle speed is above the predetermined threshold.

4. The vehicle computer of claim 1,
wherein commanding the at least one actuator includes sending a first signal to the first actuator, the first signal commanding the first actuator to vibrate in accordance with a first magnitude, and sending a second signal to the second actuator, the second signal commanding the second actuator to vibrate in accordance with a second magnitude.

5. The vehicle computer of claim 4, wherein the first magnitude is different from the second magnitude.

6. The vehicle computer of claim 4, wherein the processor is programmed to select the first magnitude and the second magnitude based on the vehicle speed.

7. The vehicle computer of claim 6, wherein selecting the first magnitude and the second magnitude based on the vehicle speed includes selecting the first magnitude to be greater than the second magnitude as a result of determining that the vehicle speed is below the predetermined threshold.

8. The vehicle computer of claim 6, wherein selecting the first magnitude and the second magnitude based on the vehicle speed includes selecting the second magnitude to be greater than the first magnitude as a result of determining that the vehicle speed is above the predetermined threshold.

9. The vehicle computer of claim 4, wherein the first signal commands the first actuator to vibrate at a first plurality of different frequencies over time and wherein the second signal commands the second actuator to vibrate at a second plurality of different frequencies over time.

10. The vehicle computer of claim 9, wherein the first plurality of different frequencies includes a first minimum frequency and a first maximum frequency.

11. The vehicle computer of claim 10, wherein the second plurality of different frequencies includes a second minimum frequency and a second maximum frequency.

12. The vehicle computer of claim 11, wherein the first minimum frequency is different from the second minimum frequency.

13. The vehicle computer of claim 11, wherein the first maximum frequency is different from the second maximum frequency.

14. The vehicle computer of claim 9, wherein the processor is programmed to clip at least one of the first plurality of different frequencies and second plurality of different frequencies.

15. The system of claim 1, wherein commanding the at least one actuator to vibrate the sensor housing includes actuating the second actuator based on the vehicle speed relative to the predetermined threshold.

16. A method comprising:
determining a vehicle speed,
selecting at least one actuator to vibrate a sensor housing based on the vehicle speed, and commanding the at least one actuator to vibrate the sensor housing based on the vehicle speed to remove debris from the sensor housing;
wherein selecting the at least one actuator includes selecting from among a first actuator and a second actuator, wherein the first actuator is disposed on the sensor housing and configured to vibrate the sensor housing in an axial direction and the second actuator is disposed on the sensor housing and configured to vibrate the sensor housing in a radial direction;
wherein commanding the at least one actuator to vibrate the sensor housing includes actuating the first actuator based on the vehicle speed relative to a predetermined threshold and actuating the second actuator based on the vehicle speed.

17. The method of claim 16,
wherein commanding the at least one actuator includes sending a first signal to the first actuator, the first signal commanding the first actuator to vibrate in accordance with a first magnitude, and sending a second signal to the second actuator, the second signal commanding the second actuator to vibrate in accordance with a second magnitude, and
wherein the first magnitude and the second magnitude are selected based on the vehicle speed.

18. The method of claim 17,
wherein selecting the first magnitude and the second magnitude based on the vehicle speed includes selecting the first magnitude to be greater than the second magnitude as a result of determining that the vehicle speed is below the predetermined threshold and selecting the second magnitude to be greater than the first magnitude as a result of determining that the vehicle speed is above the predetermined threshold.

19. The method of claim 17, wherein the first signal commands the first actuator to vibrate at a first plurality of different frequencies over time and wherein the second signal commands the second actuator to vibrate at a second plurality of different frequencies over time,
wherein the first plurality of different frequencies includes a first minimum frequency and a first maximum frequency, and wherein the second plurality of different frequencies includes a second minimum frequency and a second maximum frequency.

20. The method of claim 16, wherein commanding the at least one actuator to vibrate the sensor housing includes actuating the second actuator based on the vehicle speed relative to the predetermined threshold.

* * * * *